United States Patent  [15] 3,679,751
Golden et al. [45] July 25, 1972

[54] BORIC ACID RECOVERY

[72] Inventors: Richard L. Golden, Oradell, N.J.; Gerald Mazzella, Brooklyn, N.Y.

[73] Assignee: Halcon International, Inc.

[22] Filed: July 25, 1968

[21] Appl. No.: 747,474

Related U.S. Application Data

[62] Division of Ser. No. 429,165, Jan. 29, 1965, Pat. No. 3,423,471.

[52] U.S. Cl. ............................ 260/586 B, 23/59, 260/457, 260/462 R, 260/462 A, 260/597, 260/617 H, 260/631 B, 260/632 CB
[51] Int. Cl. .................................................... C07c 45/02
[58] Field of Search .............. 23/59; 260/586 B, 597, 617 H, 260/631 B, 632 CB

[56] References Cited

UNITED STATES PATENTS

| | | | |
|---|---|---|---|
| 3,287,423 | 11/1966 | Steeman | 260/617 H |
| 3,232,704 | 2/1966 | Helbig | 260/586 B |
| 3,109,864 | 11/1963 | Fox | 260/586 B |
| 2,410,642 | 11/1946 | Farkas | 260/586 B |

*Primary Examiner*—Leon Zitver
*Assistant Examiner*—Norman Morgenstern
*Attorney*—William C. Long, Mario A. Monaco, Morris Wiseman and David Dick

[57] ABSTRACT

This invention relates to an improved process for the recovery of boron compounds used to form borate esters in hydrocarbon oxidation processes, which comprises removing dissolved and entrained organic material from the aqueous phase of the hydrocarbon oxidation process by extraction with a hydrocarbon or alcohol solvent.

4 Claims, No Drawings

BORIC ACID RECOVERY

This application is a divisional continuation application of Ser. No. 429,165 filed Jan. 29, 1965, now U.S. Pat. 3,423,471, issued on Jan. 21, 1969.

This invention relates to an improved process for the oxidation of hydrocarbons in the presence of boron compounds. More specifically it relates to improved techniques for the effective recovery of boron compounds from the oxidation mixtures and for the efficient reuse of these compounds.

The use of boron compounds is of significant value in hydrocarbon oxidation processes where high yields of alcohol and ketone are desired. When boron compounds, as for example boric acid, metaboric acid, tetra boric acid, boron oxide or others are present in a hydrocarbon mixture undergoing oxidation by molecular oxygen, reactions take place between these compounds and the peroxides, alcohols, and other partial oxidation products formed, and borate or perborate esters are formed. The esters are then hydrolyzed with water forming thereby the alcohol and boric acid.

The aqueous and organic phases in the hydrolysis effluent are separated and the latter can be distilled to recover alcohol. Boric acid is recovered from the aqueous phase by crystallization, dehydrated, and reused in the oxidation step.

Serious process problems, however, are encountered in the crystallization and boric acid recovery steps. Very small amounts of organic material entrained in the aqueous phase, cause the adherance of solid boric acid to the surfaces of the crystallizing vessel; this results in the growth of heavy deposits on these surfaces. The rate of accumulation of these deposits is such that the such that the majority of the boric acid can be found adhering to the surfaces rather than as suspended crystals. The formation of such deposits in crystallizers is known in the art but the rate of deposition in this case is extraordinary and leads not only to difficulty in recovering the boric acid but also the abnormally frequent shutdowns of the crystallization equipment.

It is an object of this invention to provide an improved process for the recovery of the boron compounds used to form borate and perborate esters in hydrocarbon oxidation processes wherein high selectivities to the hydrocarbon alcohol are desired.

It is a further object of this invention to provide improved techniques for the efficient crystallization of boric acid from the aqueous phase of the mixture formed when the borate or perborate esters are hydrolyzed with water.

It is a further object of this invention to provide a technique whereby the boric acid can be recovered efficiently from the aqueous phase of the hydrolysis step, as uniform, freely-suspended crystals and to assure thereby their successful reuse of the oxidation step.

It is a still further object of this invention to provide techniques whereby the crystallization equipment can be operated continuously and without the necessity of frequent shutdowns due to the formation of unmanageable cakes in the internals of the equipment.

Other objects will be apparent from the following description of the invention.

In accordance with the present invention it has been discovered that the boric acid dissolved in the aqueous hydrolysis effluent can be efficiently recovered, and boric acid caking in the crystallizer can be avoided, if the aqueous phase is treated so as to reduce the total contained organic material to a level such that when the aqueous phase is cooled and/or concentrated in a crystallizer, the total organic material entrained in the mother liquor, as distinguished from that dissolved in the mother liquor, is less than about 0.01 percent by weight.

And it has been discovered that by so treating the aqueous phase the necessity for plant shutdown is greatly reduced; the size of the crystallization equipment is reduced and problems in operating the boric acid recovery system are avoided.

It has further been discovered that the loss of boron values in the crystallizer is greatly reduced.

Only organic material that is entrained in the mother liquor during crystallization creates problems during the crystallization of boric acid; organic material which remains dissolved in the aqueous phase during crystallization can obviously have no effect upon the crystals nor cause boric acid deposits to form on the surface of the crystallization zone. The organic material contained in the aqueous phase after the hydrolysis step is both dissolved and entrained. The relative and absolute amounts of each depend upon the hydrocarbon being oxidized, the extent of its oxidation, the amounts and types of oxygenated by-products formed, the effectiveness of the phase separation, and the hydrolysis temperature. It is therefore impossible to generalize as to the total amount, the nature, or the physical form, that is whether dissolved or entrained, of the contained organic material. It has been discovered, however, that sufficient organic material must be removed from the aqueous phase to ensure that when the temperature of the system is lowered, or water is removed from the system or combinations of these procedures are carried out, the amount of entrained organic material in the mother liquor does not exceed about 0.01 percent by weight.

Since most organic materials encountered in the oxidations embraced by this invention have a solubility in water orders of magnitude less than 0.01 percent by weight, it is usually necessary to remove only entrained organic material from the aqueous phase; any organic material coming out of solution during the cooling and/or concentration of mother liquor would be negligible. Therefore, where supersaturation is induced by mother liquor cooling the amount of entrained organic material must be reduced to about 0.01 percent by weight, but where supersaturation is induced by mother liquor concentration, as by either evaporative or vacuum means, the amount of entrained organic material must be reduced to less than about 0.01 percent by weight so as to ensure that the final crystallization liquor will not contain more than about 0.01 percent by weight.

Some of the organic materials encountered may have a solubility in water in the range of or exceeding about 0.01 percent by weight. Highly oxygenated residues in particular may have such a solubility. In such systems, dissolved as well as entrained organic materials must be removed. Since both the cooling or the concentration of the mother liquor may cause dissolved organic material to come out of solution, care must be taken to reduce the amount of both forms of contained organic material to ensure that at the lowered temperature the amount of free organic material in the mother liquor does not exceed about 0.01 percent by weight.

The organic material can be removed from the aqueous phase by extraction.

The extraction of the aqueous phase may be carried out with a relatively pure hydrocarbon stream.

The solvent can be any hydrocarbon which will selectively dissolve the contained organics from the aqueous phase, which is immiscible with water and which will readily form a separate phase. The preferred solvents are the process feed stock and the product alcohol; where the precess feed stock is used, the extract may be recycled to the oxidation step.

Pressure is not a critical variable and may be from atmospheric to 500 psig; however, it is customary to carry out the extraction at pressures from atmospheric to 50 psig, and preferably at pressures from 10 psig to 40 psig.

The temperature of the extraction should be high enough to avoid crystallization of boric acid from the aqueous phase but low enough to avoid excessive loss of solvent into the aqueous phase or degradation of the organic material being extracted. Temperatures in the range of 25° to 100°C. are suitable but it is preferred to operate between 40° and 80°C.

Conventional equipment and techniques are suitable for carrying out this operation. For example single stage contacting, multistage contacting, or true continuous counter-current extraction may be performed in any equipment suitable for the purpose. Mechanical mixers, pumps, column mixers and the like are examples of equipment for multistage operations; packed towers, sieve towers, baffled columns and the like may be used in continuous counter-current operations.

The amount of solvent required will depend upon the nature of the organics and their quantity in the aqueous system to be treated; from 0.01 to 20 times the amount of water but desirably from 0.05 to 5 and preferably from 0.20 to 3 times the amount of water should be used.

Where the extracting solvent is the process feed stock rather than an innocuous light hydrocarbon, extraction may be followed by steam stripping to remove any entrained solvent.

Where evaporative or vacuum means are used to induce supersaturation in the mother liquor, and relatively light organics are involved, some of the organics may be removed in the crystallizer itself by vaporization along with the mother liquor. This means is especially appropriate where considerable water must be removed before crystallization is induced. However, the solution from which crystals are deposited must nevertheless contain less than 0.01 percent by weight of free organic.

The following examples indicate the effect upon boric acid crystallization from aqueous hydrolysis effluent of reducing the organic content of the mother liquor to less than 0.01 percent by weight of the total solution. All parts and percents are parts and percents by weight.

EXAMPLE I 100 parts of cyclododecane and 4 parts of metaboric acid are oxidized using air as the oxidizing gas at 170°–175°C. and atmospheric pressure. The oxidation is carried out in an agitated reactor equipped with an overhead condenser and decanter for separating the water of oxidation. When sufficient oxygen has been absorbed to effect 15 percent conversion of the hydrocarbon, the reactor contents are discharged to a hydrolyzing tank. Hydrolysis of the borate esters is effected by contacting the oxidation effluent with a saturated solution of boric acid, at 85°C. in a ratio of 1.4 lbs. of oxidate per lb. of aqueous phase, and agitating at 97°–100°C. for 1 hour. After a 15 minute settling period, the liquid phases are separated by decantation.

Crystallization of the boric acid contained in a portion of the aqueous phase withdrawn from the hydrolysis tank is conducted batchwise in an agitated, surface-cooled crystallizer constructed partly of glass and partly of 316 stainless steel. The rate of cooling from 97°C. is controlled to give a crystallization rate of 3 to 4 lbs. orthoboric acid per hour per ft.$^3$ At 85°C. the crystalline boric acid is filtered from the mother liquor.

Inspection of the internals of the crystallizer shows all metal parts to be heavily coated with boric acid. The yield of freely suspended boric acid is poor.

EXAMPLE II

A portion of the aqueous boric acid solution prepared in the hydrolysis step of Example I is charged to an agitated vessel along with an equal weight of cyclohexane. The mixture is agitated vigorously at 95°–100°C. under 50 psig pressure for 1 hour. After settling for 30 minutes, the phases are separated. The cyclohexane extracted aqueous phase contains less than about 0.01 percent of residual high-boiling organic material.

Boric acid is crystallized from the cyclohexane extracted aqueous solution in a manner similar to that described in Example I Inspection of the crystallizer after completion of the crystallization step shows all internal parts to be free of any solid coating. The yield of freely suspended crystalline boric acid is high.

EXAMPLE III

A portion of an aqueous hydrolysis phase obtained by procedures similar to those described in Example I is extracted with cyclohexane by the procedure described in Example II. After phase separation, the cyclohexane is evaporated. High boiling organic residues equal in amount to about 0.01 percent of the portion of the original aqueous phase extracted are left after all the cyclohexane has been evaporated. The untreated portion of the original aqueous hydrolysis phase is cooled as in Example I and the crystallization is equally unsatisfactory. The portion of the aqueous phase which has been cyclohexane extracted and which contains less than about 0.01 percent high boiling organics is similarly cooled. No boric acid deposits in the crystallizer and boric acid recovery is high.

EXAMPLE IV

Methylcyclotetradecane is oxidized by the procedures illustrated in Example I. The oxidation product is hydrolyzed and boric acid is crystallized from a portion of the aqueous hydrolysis effluent. Prior to crystallization, the aqueous phase contains in excess of 0.01 percent organic material. Results obtained similar to those in Example I.

Another portion of the aqueous hydrolysis effluent is extracted with cyclohexane by the method described in Example II, the organic content being reduced thereby to less than 0.01 percent. In the crystallization of boric acid, results are obtained similar to those in Example II.

The compounds which can be oxidized with molecular oxygen in the presence of boron compounds and which create the crystallization problems herein described are substituted or unsubstituted, saturated or unsaturated, cyclic or acyclic hydrocarbons containing from eight to 30 carbon atoms. $C_6$ compounds and their oxygenated derivatives, such as cyclohexane, though present in hydrolysis liquor to a greater extend than $C_8$–$C_{30}$ compounds, do not cause the severe coating in the crystallizer.

Illustrative of these compounds are paraffins such as octane, decane, dodecane, tetradecane, eicosane, docosane, triacontane and the like; olefins such as octene, dodecene, eicosene, docosene, and the like; cycloalkanes, such as cyclooctane, cyclododecane, cyclooctadecane, cyclodocosane and the like; mono-or poly-alkyl, aryl alkaryl or aralkyl substituted cycloalkanes such a methyl cyclododecane, ethylcyclooctadecane diisopropyl cycloheptadecane and the like. The hydrocarbons can contain non-hydrocarbon substituent groups which are stable during the oxidation reaction such as hydrocarbon ester groups, borate ester groups, nitro groups, sulfone groups, and the like. Examples of such substituted compounds are cyclododecyclacetate, cyclododecylborate, methylcyclododecyl phenyl sulfate, nitro-cyclododecane, and the like.

Boron compounds which are used in the oxidation are those compounds which can react with the product alcohol to form a borate ester. This also includes boron compounds which react with hydroperoxides to form either borate or perborate esters. Boron compounds particularly suitable for use in the oxidation are boric acid, meta boric acid, tetra boric acid or boron oxide.

The boron compounds are employed in an amount effective to improve the selectivity of the oxidation reaction. It is desirable to employ sufficient of the boron compound to react with all of the hydrocarbon alcohol to form the borate ester thereof. Lesser amounts can be employed where lower selectivity improvements are permissible. It is preferable however, to employ amounts of the boron compound in excess of that necessary to react with all of the alcohol. The preferred range is 0.4 to 20 parts be weight boron compound, expressed as meta boric acid, per 100 parts of boron hydrocarbon feed mixture.

Air is normally employed to provide the molecular oxygen, although mixtures of oxygen with inert gases wherein the oxygen is present in greater or lesser amounts than in air can also be employed.

The oxidation reaction conditions can be those previously employed in the oxidation of hydrocarbons to alcohols and ketones. A catalyst such as cobalt or manganese can be employed, preferably in the form of a soluble salt such as the naphthenate, although such catalysts are not necessary.

Suitable oxidation reaction temperatures are broadly 75° to 300°C., desirably 100° to 200°C. and preferably 140° to 180°C. It is necessary that the reaction be carried out with efficient removal of water which is either formed by the oxidation and esterification, contained in the feed air, or formed by dehydration of the boron compound. The water removal is preferably accomplished by continuously removing a hydrocarbon-water vapor mixture during the reaction, condensing these components, separating water and recycling the hydrocarbon to the reaction. Other water removal techniques can be employed.

The reaction pressure is maintained at a sufficient level to insure that most of the hydrocarbon remains in the liquid phase at the reaction temperature while at the same time permitting a high boil-up rate of the hydrocarbon-water vapor mixture so that water removal is facilitated. Illustrative pressures are in the range of 10 to 500 psig.

Reaction initiator, e.g., hydrocarbon ketone can be employed. Reaction times generally in the range of 10 minutes to 15 hours are suitable.

At the termination of the oxidation reaction, the reaction mixture contains a substantial amount of the hydrocarbon in the form of a borate ester thereof. If desired the borate ester can be recovered as such. In order to recover the alcohol, as such, it is desirable to subject the oxidation reaction mixture to a hydrolysis. The hydrolysis is readily accomplished, for example, by adding water or preferably an aqueous solution of boric acid to the oxidation reaction mixture, agitating the mixture, and heating if necessary, e.g., to 50°-150°C. It is preferable to use an excess of water over that required to hydrolyze the ester.

The hydrolysis mixture is then allowed to settle into two phases, a lighter organic phase and a heavier aqueous phase. The latter containing boric acid and minor amounts of dissolved and entrained organic matter is withdrawn from the settling zone and fed to the crystallizer.

After treatment by the method of this invention, crystallization from the aqueous phase is carried out by cooling to the crystallization point of the boric acid.

Supersaturation may be induced by any of the methods known to the art, for example: cooling the feed by heat exchange, evaporating mother liquor by supplying heat, or vaporizing mother liquor by evacuating the crystallizer.

The crystals formed may be removed from the mother liquor in any known manner, for example, by centrifugation or vacuum filtration.

In view of the foregoing disclosure, variations and modifications thereof will be apparent to one skilled in the art, and it is intended to include within the invention all such variations and modifications except as do not come within the scope of the appended claims.

We claim:

1. In a process for the oxidation of hydrocarbons containing eight to 30 carbon atoms in the presence of a boron compound wherein the reaction mass contains boron esters of alcohols corresponding to said hydrocarbons, wherein said reaction mass is hydrolyzed to form an organic phase containing alcohols corresponding to said hydrocarbons and an aqueous phase containing boric acid and wherein said boric acid is recovered by crystallization from the aqueous phase, the improvement of:

removing sufficient dissolved and entrained organic material from said aqueous phase prior to crystallization of boric acid, to ensure that the mother liquid, from which boric acid crystals form, contains less than about 0.01 percent by weight entrained organic material, said removal of said organic materials being accomplished by solvent extracting said aqueous phase with a solvent which is a hydrocarbon containing eight to 30 carbon atoms or a product alcohol corresponding to the hydrocarbon being oxidized, said solvent extracting being effected at a pressure of atmospheric to 500 psig and a temperature of 25° to 100°C., using an amount of solvent which is 0.01 to 20 volumes per volume of said aqueous phase and being carried out to an extent that said entrained organic material content is reduced to said less than about 0.01 percent by weight.

2. A process of claim 1 wherein the hydrocarbon is cyclododecane.

3. A process of claim 1 wherein the hydrocarbon is a normal paraffin material containing from 10 to 16 carbon atoms.

4. A process of claim 1 wherein the hydrocarbon is normal decane.

* * * * *